(12) United States Patent
Bensimon et al.

(10) Patent No.: US 8,103,122 B2
(45) Date of Patent: Jan. 24, 2012

(54) FEATURE ADAPTED BEAMLET TRANSFORM APPARATUS AND ASSOCIATED METHODOLOGY OF DETECTING CURVILINEAR OBJECTS OF AN IMAGE

(75) Inventors: Aaron Bensimon, Antony (FR); Jean-Christophe Olivo-Marin, Sceaux (FR); Sylvain Berlemont, Paris (FR)

(73) Assignees: Institut Pasteur, Paris (FR); Genomic Vision, Paris (FR)

( * ) Notice: Subject to any disclaimer, the term of this patent is extended or adjusted under 35 U.S.C. 154(b) by 954 days.

(21) Appl. No.: 12/081,280

(22) Filed: Apr. 14, 2008

(65) Prior Publication Data

US 2009/0175541 A1 Jul. 9, 2009

Related U.S. Application Data

(60) Provisional application No. 60/911,797, filed on Apr. 13, 2007.

(51) Int. Cl.
*G06K 9/40* (2006.01)

(52) U.S. Cl. .......................................... 382/275; 345/15

(58) Field of Classification Search .................... 345/15; 382/275

See application file for complete search history.

(56) References Cited

U.S. PATENT DOCUMENTS 5,828,491 A * 10/1998 Neuman et al. ............... 359/565

OTHER PUBLICATIONS

Sylvain Berlemont, Aaron Bensimon, and Jean-Christophe Olivo-Marin, "Detection of Curvilinear Objects in Noisy Image Using Feature-Adapted Beamlet Transform", 2007, IEEE.*
U.S. Appl. No. 12/595,686, filed Oct. 13, 2009, Berlemont, et al.

* cited by examiner

*Primary Examiner* — Gregory F Cunningham
(74) *Attorney, Agent, or Firm* — Oblon, Spivak, McClelland, Maier & Neustadt, L.L.P.

(57) ABSTRACT

A method of detecting a curvilinear object of a noisy image. The method includes filtering the noisy image in accordance with a two dimensional line profile. The line profile is selected within a class of steerable filters. A beamlet coefficient is calculated in accordance with the filtering, wherein a coefficient above a predetermined threshold identifies a local feature.

8 Claims, 8 Drawing Sheets

FEATURE ADAPTED BEAMLET TRANSFORM APPARATUS AND ASSOCIATED METHODOLOGY OF DETECTING CURVILINEAR OBJECTS OF AN IMAGE

CROSS-REFERENCE TO RELATED APPLICATIONS

This application claims the benefit of the earlier filing date of U.S. Provisional Application No. 60/911,797, filed Apr. 13, 2007, entitled "A Feature Adapted Beamlet Transform Apparatus and Associated Methodology of Detecting Curvilinear Objects of an Image" the entirety of which is incorporated herein by reference.

BACKGROUND

The claimed advancements described herein relate to a system and associated methodology of detecting curvilinear objects in an image. More specifically, an apparatus and associated methodology are provided for performing a feature adapted Beamlet transform for the detection of curvilinear objects in a noisy image via a software and/or hardware implementation.

In image processing systems computer vision applications and the like, the detection of curvilinear objects is often times desired. Such objects occur in every natural or synthetic image as contours of objects, roads in aerial linear imaging or DNA filaments in microscopy applications. Currently, there is no known methodology in which a steerable filter may be leveraged to employ line segment processing methodologies such as beamlet methods for representing curvilinear objects carrying a specific line-profile.

Curvilinear objects are considered as 1 dimensional manifolds that have a specific profile running along a smooth curve. The shape of this profile may be an edge or a ridge-like feature. It can also be represented by more complex designed features. For example, in the context of DNA filament analysis in fluorescent microscopy, it is acceptable to consider the transverse dimension of a filament to be small relative to the PSF (point spread function) width of the microscope. Hence, the shape of the profile may be accurately approximate by a PSF model.

One way to detect curvilinear objects is to track locally the feature of the curve-profile; linear filtering or template matched filtering are well-known techniques for doing so. Classical Canny edge detector and more recently designed detectors are based on such linear filtering techniques. They involve the computation of inner-products with shifted and/or rotated versions of the feature template at every point in the image. High response at a given position in the image means that the considered area has a similarity with the feature template. Filtering is usually followed by a non-maxima suppression and a thresholding step in order to extract the objects. The major drawbacks of such approaches come from the fact that linear filtering is based on local operators. Hence it is highly sensitive to noise but not sensitive to the underlying smoothness of the curve, which is a typical non-local property of curvilinear objects.

Alternatively, the Radon transform is a powerful non-local technique which may be used for line detection. Also known as the Hough transform in the case of discrete binary images, it performs a mapping from the image space into a line parameter space by computing line integrals. Formally, given an image f defined on a sub-space of $R^2$, for every line parameter $(\rho, \theta)$, it computes $$\varphi(\rho, \vartheta) = \int_{-\infty}^{\infty}\int_{-\infty}^{\infty} f(x, y)\delta(\rho - x\cos(\theta) - y\sin(\theta))\,dx\,dy. \qquad (1)$$

Peaks in the parameter space reveals potential lines of interest. This is a very reliable method for detecting lines in noisy images. However, there are several limitations. First, direct extension of that method to detect more complex curves is unfeasible in practice for it increases the complexity exponentially by adding one dimension to the parameter space. In addition, Radon transform computes line integrals on lines that pass through the whole image domain and does not provide information on small line segments.

Given an image of N×N pixels, the number of possible line segments defined is in $O(N^4)$. Direct evaluation of line integrals upon the whole set of segments is practically infeasible due to the computational burden. One of the methodologies proposed to address this problem is the Beamlet transform. It defines a set of dyadically organized line segments occupying a range of dyadic locations and scales, and spanning a full range of orientations. This system of line segments, called beamlets, have both their end-points lying on dyadic squares that are obtained by recursive partitioning of the image domain. The collection of beamlets has a $O(N^2 \log(N))$ cardinality. The underlying idea of the Beamlet transform is to compute line integrals only on this smaller set, which is an efficient substitute of the entire set of segments for it can approximate any segment by a finite chain of beamlets. Beamlet chaining technique also provides an easy way to approximate piecewise constant curves.

Formally, given a beamlet $b=(x, y, l, \theta)$ centered at position $(x,y)$, with a length l and an orientation $\theta$, the coefficient of b computed by the Beamlet transform is given by $$\Phi(f, b) = \int_{-1/2}^{1/2} f(x + \gamma\cos(\theta), y + \gamma\sin(\theta))\,d\gamma. \qquad (2)$$

Equation (2) is closely related to equation (1) since Beamlet transform can be viewed as a multiscale Radon transform; they both integrate image intensity along line segments. However, they do not take into account any line-profile. It implies that the Radon and Beamlet transforms are not well-adapted to represent curvilinear objects carrying a specific line-profile.

Accordingly, a feature-adapted Beamlet transform is provided to represent curvilinear objects of a specific line profile.

SUMMARY OF EXEMPLARY ASPECTS OF THE ADVANCEMENTS

In one aspect, a method of detecting a curvilinear object of a noisy image is provided. The method includes filtering the noisy image in accordance with a two dimensional line profile. The line profile is selected within a class of steerable filters. A beamlet coefficient is calculated in accordance with the filtering, wherein a coefficient above a predetermined threshold identifies a local feature.

In a further aspect, a method of detecting a curvilinear object of a noisy image is disclosed. The method includes filtering the noisy image in accordance with a two dimensional line profile. The line profile is selected within a class of steerable filters. A beamlet coefficient is calculated in accordance with the filtering, wherein a coefficient above a predetermined threshold identifies a local feature. The noisy image is convolved in accordance with a number of basic filters.

In still a further aspect of the invention, a method of detecting a curvilinear object of a noisy image is disclosed. The method includes filtering the noisy image in accordance with a two dimensional line profile. The line profile is selected within a class of steerable filters. A beamlet coefficient is calculated in accordance with the filtering, wherein a coefficient above a predetermined threshold identifies a local feature. The noisy image is convolved in accordance with a number of basic filters and each image is computed by linear combination.

It is to be understood that both the foregoing general description of the invention and the following detailed description are exemplary, but are not restrictive, of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fees.

A more complete appreciation of the invention and many of the attendant advantages thereof will be readily obtained as the same becomes better understood by reference to the following detailed description when considered in connection with the accompanying drawings, wherein.

DETAILED DESCRIPTION

A feature adapted beamlet transform apparatus and associated methodology of detecting curvilinear objects of an image is provided to unify the Beamlet transform with a linear filtering technique to introduce the Feature-adapted Beamlet Transform, which is able to incorporate knowledge of a desired line-profile running along curves. If the profile is designed as a steerable filter, this methodology leads to an efficient implementation.

Figure 1:
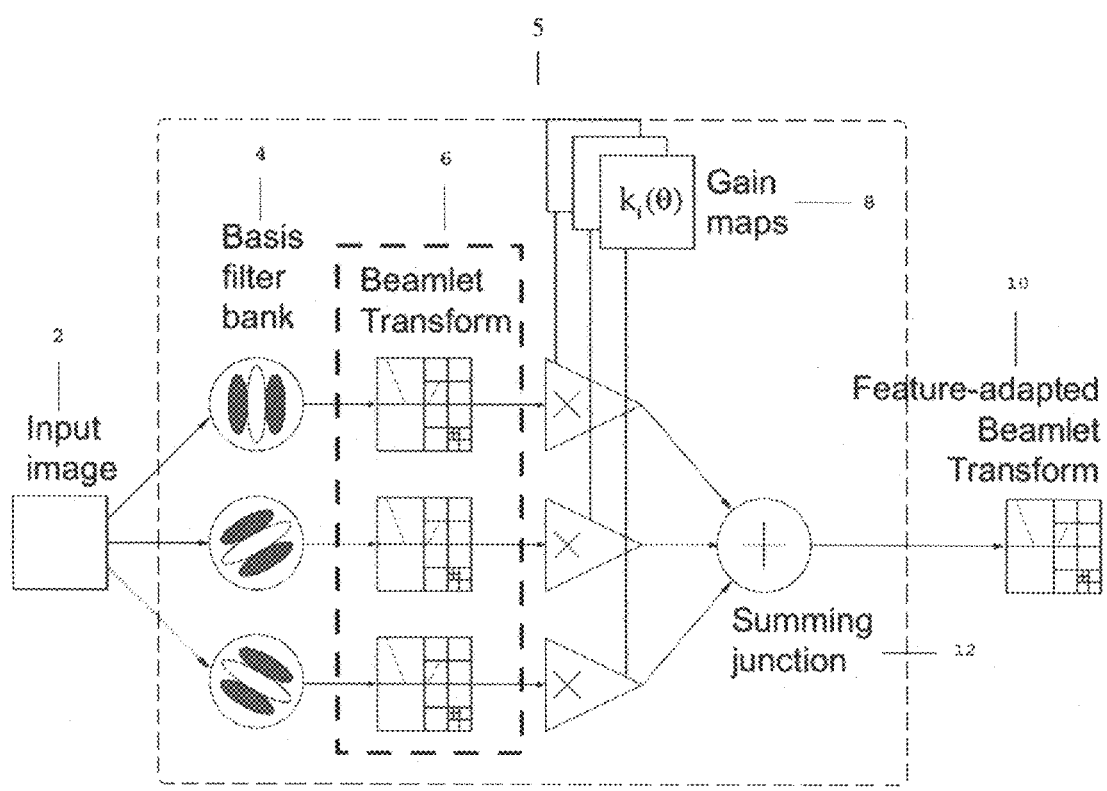
FIG. 1 illustrates a high level block diagram of a feature-adapted Beamlet transform in accordance with an exemplary aspect of the disclosure.
Figure 2:
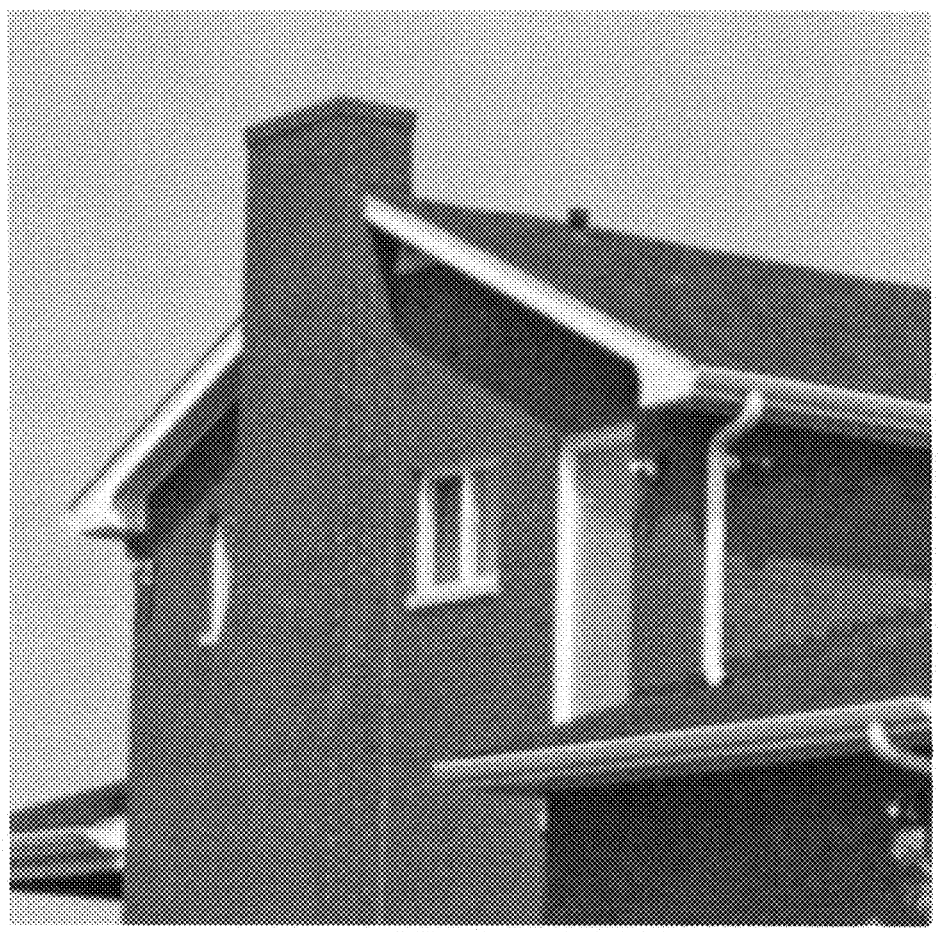
FIG. 2 illustrates an example of an original image before noise corruption.

FIG. 1 shows the Feature-adapted Beamlet transform block diagram in accordance with an exemplary embodiment. A typical input image 2 is shown for processing by the feature adapted Beamlet transform system, generally designated 5. The front end of the system includes a bank of a dedicated basis filters 4, which convolve the image as input. The output of the basis filters 4 is transformed with a Beamlet transform 6. In this regard, it is noted that the basis filters 4 and the Beamlet transform 6 are equally applicable to remotely distributed nodes, or, stand alone systems. For example, those skilled in the art will recognize that such processing may be computed on independent systems. In such cases, the Beamlet transform may be employed by a stand alone system as a local utility for facilitating image recognition. As such, it is to be understood that basis filters 4 and the Beamlet 6 transform may correspond to separate devices or separate aspects of a same device in accordance with the advancements described herein. Likewise, components 6 and 8, although illustrated as separate objects, are in exemplary embodiments described herein, components of a feature adapted Beamlet transform apparatus.

The output from the Beamlet transform 6 is multiplied by a set of gain maps 8, which apply the appropriate interpolation functions at each position and time. The summation junction 10 produces the adaptively filtered and transformed image 12.

The system 5 of FIG. 1 may embrace a personal computing device such as a PC employing an Intel Pentium processor. The instruction set described in detail below is provided as a utility application executing in conjunction with a local processor and operating system such as Microsoft VISTA®, Unix, Solaris, Linux, Apple MAC-OS and other systems known to those skilled in the art. Alternatively, those skilled in the art will recognize the applicability to mobile devices such as PDAs, phones, and portable entertainment devices which employ Symbian, Microsoft Mobile® and like operating systems. Memory required for supporting the registries, kernel and like features of FIG. 1 is omitted as well known. Likewise the description of general features of FIG. 1 such as local volatile and/or non-volatile memory, I/O capabilities, common peripheral devices, as well as corresponding functionality have been omitted for brevity, the detailed operation/description of which is well known to those skilled in the art. The specific coding and porting of the algorithms described herein is within the ability of one skilled in the art upon review of this specification.

It is understood that within the scope of the appended claims, the inventions may be practiced otherwise than as specifically described herein. For example, while described in terms of both software and hardware components interactively cooperating, it is contemplated that the feature adapted beamlet transform described herein may be practiced entirely in software, firmware, or as an Application Specific Integrated Circuit (ASIC).

As recognized by those skilled in the art, software and firmware may be embodied on a computer readable storage medium such as an optical disc or semiconductor memory.

Moreover, the feature adapted beamlet transform may be implemented as a web based utility or a web based service invoked remotely by a known protocol such as SOAP. For example, it is envisioned that the feature adapted beamlet transform may be leveraged in a research environment where images are provided to the utility via a network for servicing a group of users. Likewise, remote devices may be employed to access the feature adapted beamlet transform via a number of wireless protocols such as BLUETOOTH® and I.E.E.E.802-11x wireless formats.

All steps relative to a single basis filter can be simultaneously computed on a parallel machine. All these steps have a $O(N^2)$ complexity. In this scheme, the evaluation of beamlet coefficients consumes most of the computation time. To increase speed a cache strategy may be employed to precompute most of the computation while utilizing an approximation of beamlet coefficients based on the two-scale recursion technique. This arrangement increases speed at the expense of a memory load. For a 1024×1024 image, an implementation of the standard Beamlet transform takes approximately 1 s on a dual processors based computer.

Consider a filter h representing a 2-dimensional line-profile. Let $h^\theta$ be a rotated version of h in the direction $\theta$:

$$h^\theta(x,y)=h(R_\theta(x,y)), \quad (3)$$

where $R_\theta$ is the 2-dimensional rotation matrix of angle $\theta$. In a first step, consider filtering image f2 with $h^\theta$ before computing the beamlet coefficient from equation (2):

$$\Phi(f,b) = \int_{-1/2}^{1/2} f(x+\gamma\cos(\theta), y+\gamma\sin(\theta))d\gamma. \quad (2)$$

This yields:

$$\Psi(f,b) = \int_{-1/2}^{1/2} f*h^\theta(x+\gamma\cos(\theta), y+\gamma\sin(\theta))d\gamma. \quad (4)$$

A high coefficient identifies that the local feature runs significantly along b. This is the Feature-adapted Beamlet transform 6. In general, the computation of all beamlet coefficients is not conceivable, since it requires to convolve the image as many times as the number of $\theta$'s. For the special case where h is selected to be within the class of steerable filters, consider writing $h^\theta$ as a linear combination of basis filters 4:

$$h^\theta(x,y) = \sum_{j=1}^{M} k_j(\theta) h^{\theta_j}(x,y), \quad (5)$$

where $k_j$'s 8 are interpolation functions that only depend on $\theta$. The basis filters $h^{\theta_j}$'s 4 are independent of $\theta$. A convolution of an image with a steerable filter of arbitrary orientation is then equal to a finite weighted sum of convolution of the same image with the basis filters. Hence, equation (4) can be written as $$\Psi(f,b) = \sum_{j=1}^{M} k_j(\theta) \int_{-1/2}^{1/2} f^{\theta_j}(x+\gamma\cos(\theta), y+\gamma\sin(\theta))d\gamma \quad (6)$$
$$= \sum_{j=1}^{M} k_j(\theta)\Phi(f^{\theta_j}, b),$$

where $f^{\theta_j}=f*h^{\theta_j}$ and $\Phi(f^{\theta_j},b)$ corresponds to the beamlet coefficient of b computed over $f^{\theta_j}$ using equation (2). As a result, in order to compute equation (4) for every beamlet coefficient, consider the following: first convolve the image as many times as the number of basis filters composing our filter h. This number is typically very small. On each filtered image, compute the standard Beamlet transform. Finally, for each beamlet, compute its coefficient using equation (6).

A detection method using the Feature-adpated Beamlet transform 10 provides a list of beamlets that best represent curvilinear objects carrying a specific line-profile in an image. The method is based on a multiscale coefficient thresholding technique.

A Recursive Dyadic Partition (RDP) of the image domain is any partition, starting from the whole image domain, obtained by recursively choosing between replacing any square of the partition by its decomposition into four dyadic squares or leaving it unsplit. This concept is very similar to the quadtree decomposition technique. A beamlet-decorated RDP (BD-RDP) is a RDP in which terminal nodes of the partition are associated with at most one beamlet. By construction, BD-RDP provides a list of non-overlapping beamlets. In order to select the list of beamlets that best represent curvilinear objects in the image 2, maximize over all beamlet-decorated recursive dyadic partitions $P=\{S_1, S_2, \ldots, S_n\}$ the following complexity penalized residual sum of square:

$$E(P) = \sum_{S \in P} C_S^2 - \lambda^2 \#P, \quad (7)$$

where $$C_s = \max_{b \in S} \frac{FBT(f,b)}{\sqrt{l}}$$

measures the energy required to model the region S of the image f by the beamlet b and $\lambda$ is a MDL-like criteria that controls the complexity of the model. A high value of $\lambda$ yields to a coarse representation of curvilinear structures; a small value leads to a quite complex model with potentially a significant number of false alarms. Equation (7) can be solved very efficiently by a recursive tree-pruning algorithm due to additivity of the cost function.

Figure 3:
FIG. 3 illustrates the original image of FIG. 2 corrupted with noise.
Figure 4:
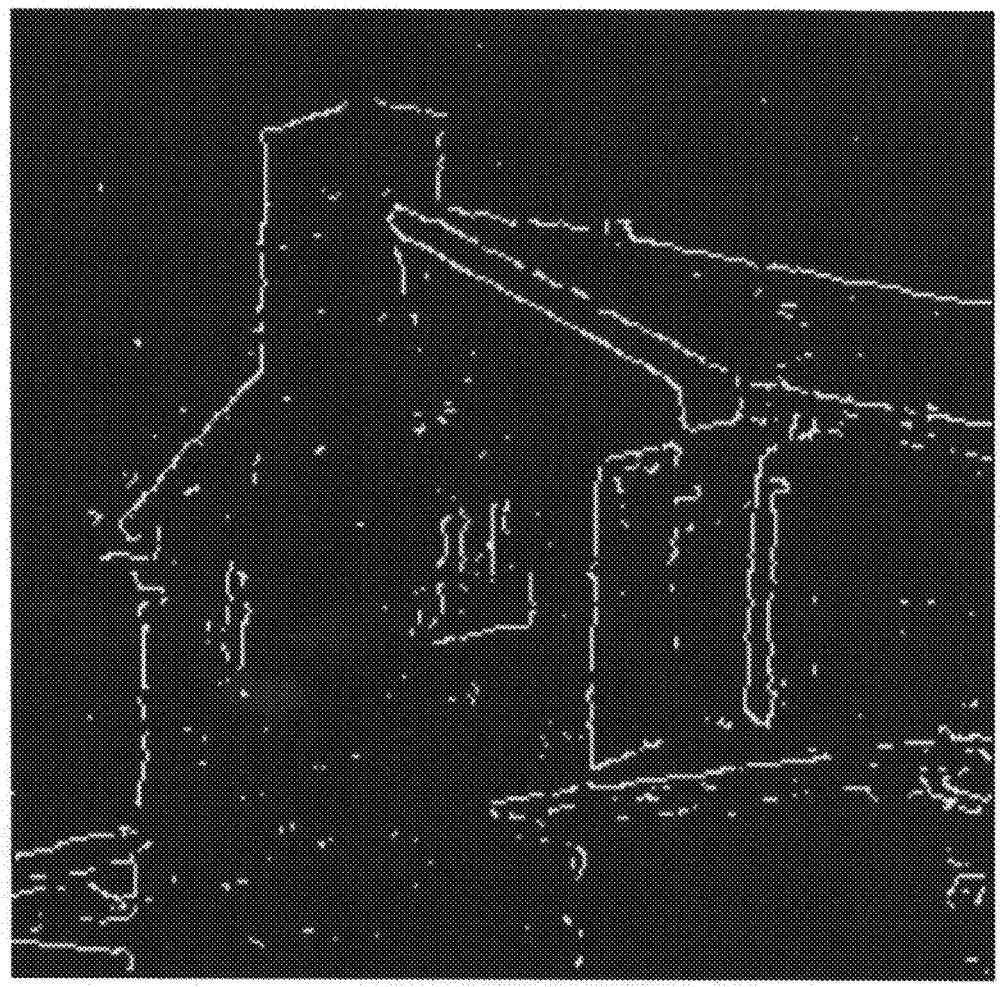
FIG. 4 illustrates the use of $3^{rd}$ order edge detection of curvilinear objects as applied to the noisy image in FIG. 3.
Figure 5:
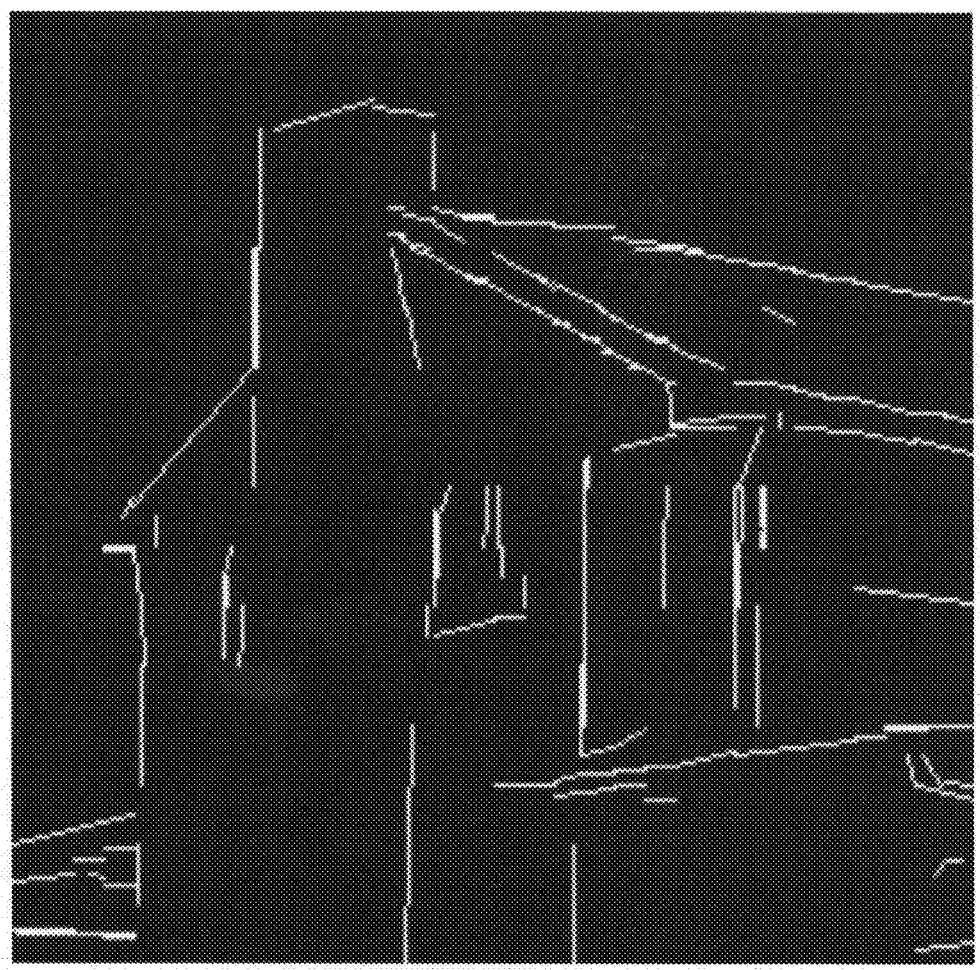
FIG. 5 illustrates detection using feature adapted beamlet transform carrying the same $3^{rd}$ order filter, as applied to the noisy image in FIG. 3, in accordance with an exemplary aspect of the disclosure.

Consider comparing this methodology with a linear filtering technique which convolves the image with a steerable filter and resolves for each image point a polynomial equation in order to find the optimal orientation maximizing the filter response. This step is followed by a non-maxima suppression and a thresholding step. Exemplary steerable filters are a combination of Gaussian-based filters which are optimized under Canny-like criteria, such as a $3^{rd}$ order filter. FIG. 3 shows results on a noisy image corrupted by Gaussian white noise with standard deviation $\sigma_{noise}=50$. In the methods described herein, the well-known Bresenham algorithm is used to highlight pixels traversed by meaningful beamlets. In both cases, the threshold value is determined to keep 2,000 pixels. As shown in FIG. 5, the number of false positives is highly reduced.

Figure 6:
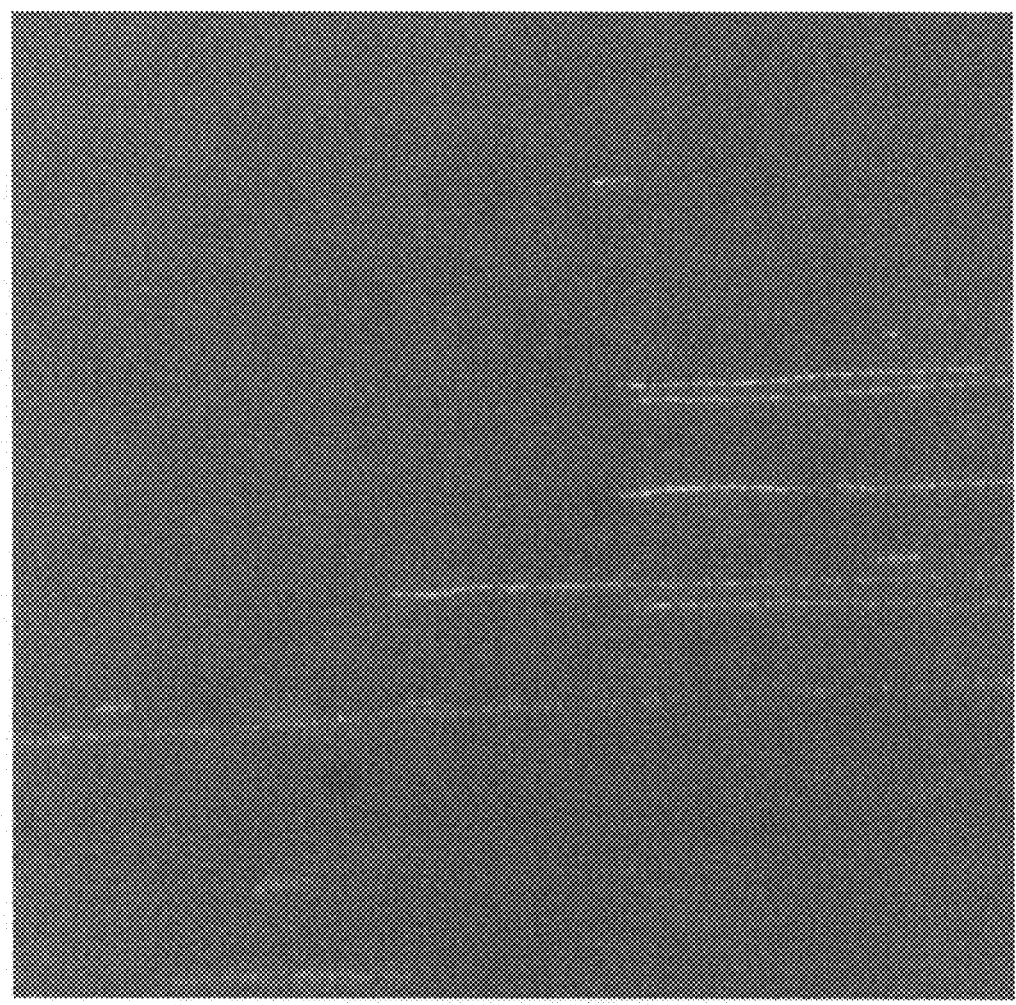
FIG. 6 illustrates an example or an original image of DNA filaments obtained by fluorescent microscopy.
Figure 7:
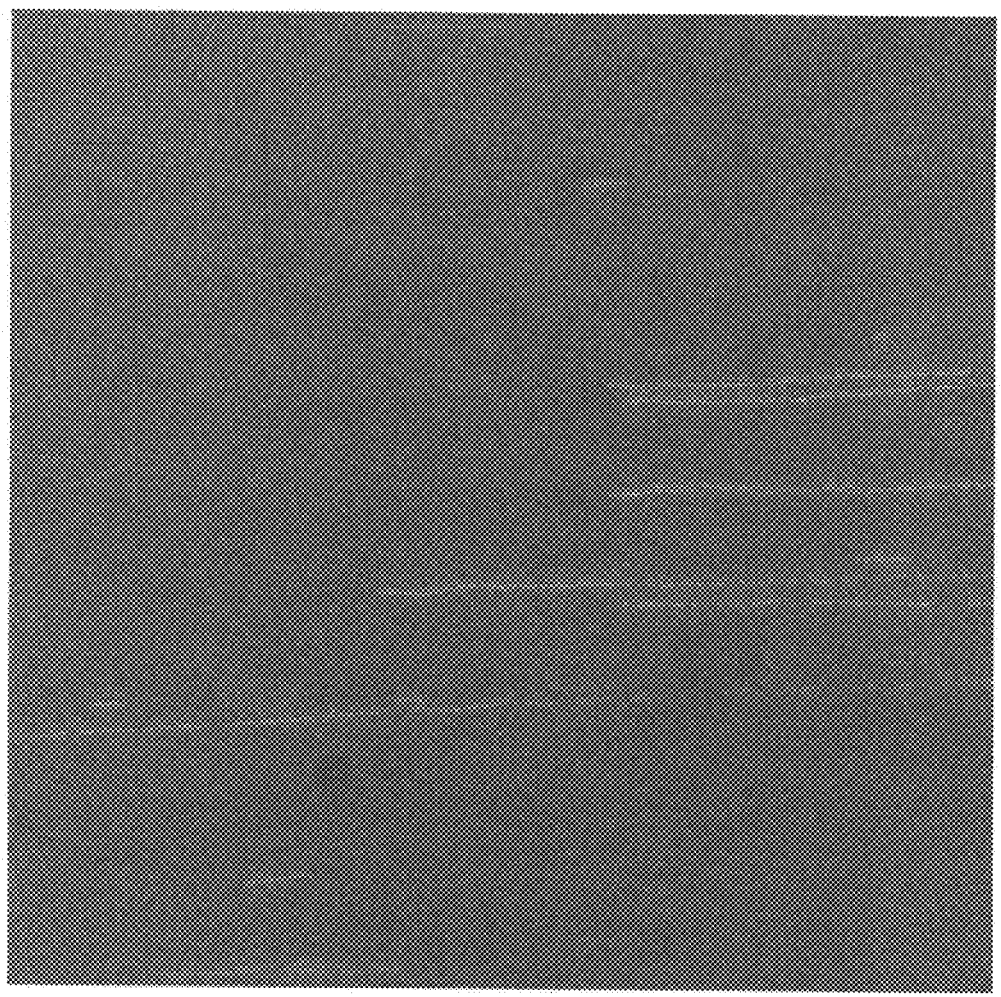
FIG. 7 illustrates the use of $2^{nd}$ order edge detection of curvilinear objects using standard beamlet transform, as applied to the original image in FIG. 6.
Figure 8:
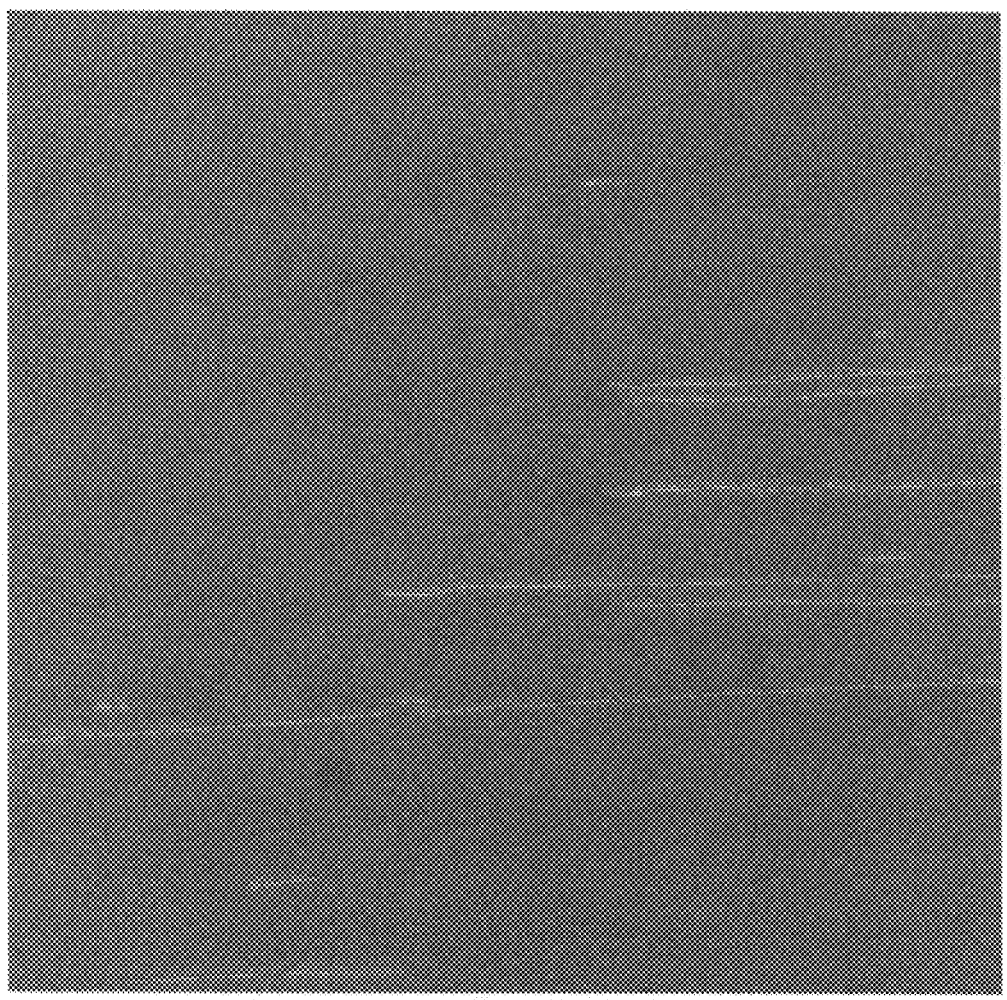
FIG. 8 illustrates detection using feature adapted beamlet transform carrying the same $2^{nd}$ order filter, as applied to the original image in FIG. 6, in accordance with an exemplary aspect of the disclosure.

Consider evaluating the performance of the Feature-adapted Beamlet transform 10 compared to the standard Beamlet transform for the detection of multiple lines segments in noisy images. Two techniques are tested on images of DNA filaments obtained by fluorescent microscopy. These filaments have a ridge-like profile. For the choice of h, we choose a $2^{nd}$ order filter. The same algorithm is used for both transforms with $\lambda=100$. The standard Beamlet transform behaves like a low-pass filter and hence, is sensitive to the background intensity, as opposed to the Feature-adpated Beamlet transform 10 which can cancel constant or more complex background, depending on the vanishing moments of h. In the example shown herein, in order to get these two transforms comparable between each other, the background is assumed to be constant and is substracted from the image before computing the beamlet coefficients. To do so, the background mean intensity is estimated from the median of the image 2. As shown in the top left corner of FIG. 6, the spurious detections are due to the fact that real background is not constant over the whole image domain. As can be seen in FIG. 7, this is not the case for the exemplary feature adapted Beamlet transform.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

The invention claimed is:

1. A method of detecting a curvilinear object of a noisy image, comprising:
    filtering the noisy image in accordance with a two dimensional line profile, the line profile being selected within a class of steerable filters; and
    calculating a beamlet coefficient in accordance with the filtering wherein a coefficient above a predetermined threshold identifies a local feature.

2. The method according to claim 1 further comprising:
    convolving a noisy image in accordance with a number of basis filters.

3. The method according to claim 2 wherein a filtered image is computed with a beamlet transform application.

4. The method according to claim 3 wherein each image is computed by linear combination.

5. A computer readable storage medium including encoded computer program instructions that causes a computer to detect a curvilinear object of a noisy image, comprising:
    filtering the noisy image in accordance with a two dimensional line-profile, the line profile being selected within a class of steerable filers; and
    calculating a beamlet coefficient in accordance with the filtering wherein a coefficient above a predetermined threshold identifies a local feature.

6. The medium according to claim 5 further comprising:
    convolving a noisy image in accordance with a number of basis filters.

7. The medium according to claim 5 wherein a filtered image is computed with a beamlet transform application.

8. The medium according to claim 5 wherein each image is computed by linear combination.

* * * * *